(12) United States Patent
Engelen et al.

(10) Patent No.: US 11,354,941 B2
(45) Date of Patent: Jun. 7, 2022

(54) LASER SPECKLE ANALYSIS FOR BIOMETRIC AUTHENTICATION

(71) Applicant: LUMILEDS LLC, San Jose, CA (US)

(72) Inventors: Rob Engelen, Eindhoven (NL); Emanuel Stassar, Sprang Capelle (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/640,638

(22) PCT Filed: Aug. 14, 2018

(86) PCT No.: PCT/EP2018/071978
§ 371 (c)(1),
(2) Date: Feb. 20, 2020

(87) PCT Pub. No.: WO2019/038128
PCT Pub. Date: Feb. 28, 2019

(65) Prior Publication Data
US 2021/0042547 A1 Feb. 11, 2021

(30) Foreign Application Priority Data
Aug. 22, 2017 (EP) ..................................... 17187247

(51) Int. Cl.
*G06V 40/40* (2022.01)
*G06V 10/145* (2022.01)
(Continued)

(52) U.S. Cl.
CPC ............ *G06V 40/45* (2022.01); *G06V 10/145* (2022.01); *G06V 40/13* (2022.01); *G06V 40/166* (2022.01); *G06V 40/19* (2022.01)

(58) Field of Classification Search
CPC ........... G06K 9/00906; G06K 9/00013; G06K 9/00255; G06K 9/00604; G06K 9/2036; G06K 9/00899
See application file for complete search history.

(56) References Cited

U.S. PATENT DOCUMENTS 5,189,482 A * 2/1993 Yang .................. G06K 9/00046
356/73
9,245,164 B2 1/2016 Pan et al.
(Continued)

FOREIGN PATENT DOCUMENTS

WO 2006/049396 A1 5/2006
WO 2008/113024 A1 9/2008
WO 2014/198847 A1 12/2014

OTHER PUBLICATIONS

Carlos Gonzalez Gomez: "Laser Beam Shaping", 2012, XP055449791, Brno, CZ, URL:https://repositorio.unican.es/xmlui/bitstream/handle/10902/1483/349738.pdf.
(Continued)

*Primary Examiner* — John B Strege
(74) *Attorney, Agent, or Firm* — Volpe Koenig

(57) ABSTRACT

A biometric identification system and a method for biometric authentication are described. A biometric authentication system includes at least one light source comprising at least one of a vertical surface emitting laser (VCSEL) or a VCSEL array configured to provide an illumination beam when the biometric authentication system is turned on. The system also includes an optical element configured to broaden the illumination beam and direct the illumination beam towards the portion of the object so as to generate at least one corresponding image response. The system also includes an image sensing unit configured to receive the at least one corresponding image response, capture a speckle pattern in the image response and form at least one of a computer readable image or data representing a speckle contrast in the speckle pattern.

20 Claims, 3 Drawing Sheets

(51) Int. Cl.
*G06V 40/13* (2022.01)
*G06V 40/19* (2022.01)
*G06V 40/16* (2022.01)

(56) References Cited

U.S. PATENT DOCUMENTS

| | | |
|---|---|---|
| 10,713,347 B2 | 7/2020 | Talwerdi et al. |
| 2016/0012291 A1 | 1/2016 | Cleland et al. |
| 2016/0164261 A1* | 6/2016 | Warren .................. H01S 5/026 348/164 |
| 2016/0252976 A1* | 9/2016 | Zhang ..................... G06F 3/011 345/156 |
| 2016/0352071 A1* | 12/2016 | Hogan .................. H01S 5/1835 |
| 2017/0070347 A1* | 3/2017 | Lutian ..................... G06F 21/32 |
| 2018/0060639 A1* | 3/2018 | Lee ..................... G06K 9/00087 |

OTHER PUBLICATIONS

Jim A. Tatum et al.: "High-speed characteristics of VCSELs", Proceedings of SPIE, vol. 3004, May 1997, pp. 151-159.
Dene Ringuette: "Application of Vertical-cavity Surface-emitting Lasers for Simultaneous Laser Speckle Contrast and Intrinsic Optical Signal Imaging: Toward Chronic Portable Cortical Hemodynamic Imaging", Jun. 2012, URL:https://tspace.library.utoronto.ca/bitstream/1807/32620/3/Ringuette_Dene_AA_201206_MASc_thesis.pdf.
Alfred D. Ducharme: "Microlens diffusers for efficient laser speckle generation", Optics Express, vol. 15, No. 22, Jan. 2007.
International Preliminary Report on Patentability Chapter I dated Feb. 25, 2020 for PCT International Application No. PCT/EP2018/071978.
International Search Report dated Oct. 23, 2018 for PCT International Application No. PCT/EP2018/071978.

* cited by examiner

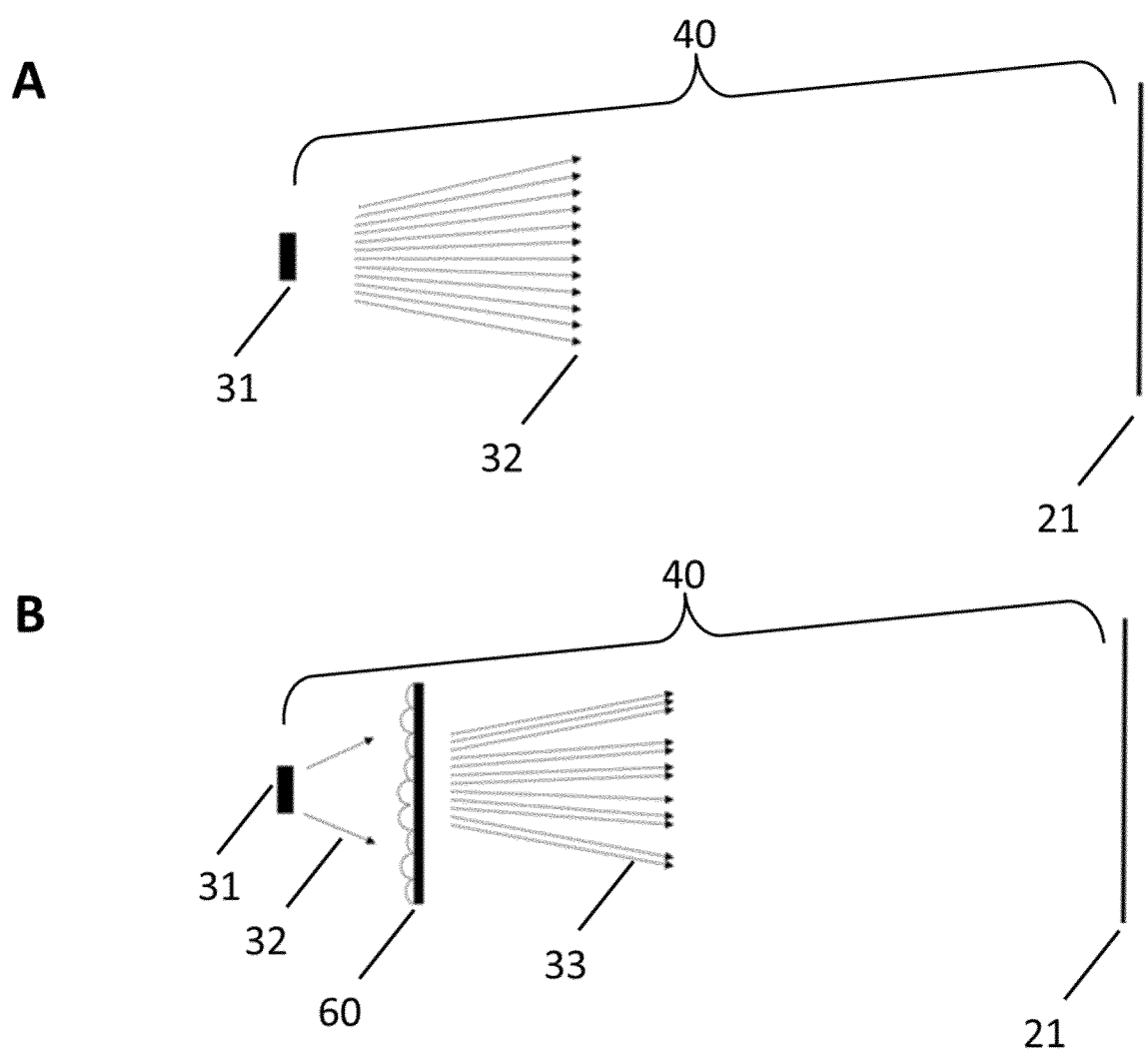

LASER SPECKLE ANALYSIS FOR BIOMETRIC AUTHENTICATION

FIELD OF THE INVENTION

The invention relates to a biometric authentication system and method for biometric authentication with enhanced security due to analysis of speckle signature. The invention further relates to a mobile device comprising the biometric authentication system of the invention.

BACKGROUND OF THE INVENTION

Biometric authentication is becoming very widespread as the technology is already present in personal computers (accessories) and mobile phones. A common biometric authentication method is imaging features of the face and deriving unique properties from it for authentication purposes. Having the ability to distinguish between a human face and a representation of it (such as a printed piece of paper or a mask) is crucial. WO 2008/11304 describes a solution with ratiometric measurements of metabolic and/or chemical intermediates within the biological tissues by irradiating the tissue with electromagnetic radiation and analysing the emitted radiation. However, this is a complex bioanalytical method which also requires direct contact of the tissue with the device (e.g. fingertips on glass plate).

Hence, there is a need for a less complex biometric authentication method with reliable discrimination between biological tissue and sham or counterfeit objects.

SUMMARY OF THE INVENTION

It is an object of the present invention to provide a biometric authentication device and method with enhanced security while being easy to use.

The invention is defined by the independent claims. The dependent claims define advantageous embodiments.

According to a first aspect a biometric identification system for authenticating a biometric on a portion of an individual is provided.

The biometric identification system comprises at least one light source unit comprising at least one VCSEL or VCSEL array to originate an illumination beam; an illumination path arranged to direct the illumination beam towards the portion of the individual so as to generate at least one corresponding image response, whereby the illumination path comprises an optical element for broadening the illumination beam; an image sensing unit arranged to receive the at least one corresponding image response, wherein the image sensing unit is capable to capture the speckle pattern in the image generated by said image sensing unit and thereby form a computer readable image and/or data representing the speckle contrast; and optionally a computing device to analyze the computer readable image data and/or the speckle contrast data as generated by the image sensing unit to verify the portion of the individual as biological tissue.

As the inventors found out the speckle contrast which is normally an undesirable effect in laser imaging can be used in a positive way to discriminate between the biological tissue and counterfeit objects such as masks, dummies or photos.

In order to use the speckle contrast as security measure the target to be analysed has to be illuminated with a laser beam. Laser light due to its considerable coherence length was shown to behave differentially in biological tissue vs. non-biological objects due to the significant reduction of speckle contrast in biological tissue.

In human tissue, the laser light will penetrate the tissue leading to multiple scatter events and potentially leaving the skin towards the image sensing unit. Hereby the laser beam that penetrates the skin will have a multitude of traversed path lengths through the skin. This multitude of path lengths is sufficiently large that the light waves do not longer interfere, as the path lengths are larger than the coherence length of the laser light. As a result the speckle contrast is significantly reduced.

For counterfeit objects such as paper or plastics the reflection of light occurs in a very shallow depth in the paper/plastics or at the paper/plastics surface. The optical path lengths are thus very similar. Therefore a significant speckle contrast will be observed.

This difference in speckle contrast can be used as signature of the kind of target that is analysed. A detection of a high speckle contrast is an indication of a non-biological object. This should then result in a failure for the identification.

The diffuse nature of human skin also has an impact on image quality when the illumination is not uniform. Laser light is usually passed through an optical element to broaden the light beam. Such an optical element like a diffuser can cause diffraction of the laser light. The resulting light from the diffusor is not longer uniform but shows a diffraction pattern with peaks and valleys as result of the interference of the diffracted light beam. One could refer to such a diffraction pattern as "illumination speckle" as it is only related to the illuminator. This in contrast to "imaging speckle", which is the interference effect taking place in a camera system when imaging coherent light from a disordered or rough surface. When a source with "illumination speckle" impinges on skin, the diffuse nature of skin will spread the light in the tissue. When the light exits the surface towards a camera it will appear much more homogeneous due to the interaction with skin. The present method is also sensitive to this apparent reduction of "illumination speckle" when imaging human skin.

The present method has the further advantage that it can be used with infrared laser light which is very common in biometric imaging.

By use of different lasers and light sensing units the method and device of the invention can be easily adopted to broad range of biometric issues.

Since every biological tissue will show the beneficial reduction in speckle contrast, the method and device of the invention can be performed with different portions of the target individual such as finger tips, hand palm, skin, retina or iris.

By the use of common laser light and common camera techniques the security feature as created by the method and device of the invention is not recognized as such and hence the target individuals do not feel the necessity to take counteractions.

Since the method of the invention can be performed with established and cost-effective components, it can be easily produced in a cost efficient manner.

DETAILED DESCRIPTION OF THE INVENTION

The present invention is based on the speckle phenomenon. The small size and narrow spectral bandwidth of lasers can cause speckle to be seen when viewing the illuminated object, as is common in laser illumination. Speckle is caused by the interaction of the laser energy with the optical surfaces that the laser energy encounters on its path from the laser aperture to the target and back to the eye or photon collection surface (i.e. retina or the camera focal plane array, respectively). Optical interference between the photons causes the appearance of bright and dark spots in the laser illuminated scene to be perceived by the camera or the eye.

In general, the present biometric invention provides devices and methods that provide speckle pattern-based discriminations between real, living targets and spoofed or sham target tissues. In some embodiments, devices and methods provide speckle pattern-based discrimination between real and sham tissue in an automated and highly secure and spoofing-resistant manner. In some embodiments, the invention uses the speckle contrast inhibition generated only by biological tissue and easily generated in non living models of tissue or surfaces, in order to make a secure and reliable biometric identification of real, live tissue, either as a single global or localized measurement, or even at multiple sites as an image.

According to the invention the light source comprises at least one laser, so that one, two, three, four or even more lasers can be used for illuminating the portion of the individual to be analysed. In a preferred embodiment the biometric identification system consists of only one laser for generating the laser beam.

In a preferred embodiment of the invention the at least one laser of the biometric authentication system is capable of generating a laser beam with a coherence length of at least 1 mm, more preferably at least 1 cm and most preferably of at least 10 cm.

The at least one laser as used herein may operate within a visible light spectrum, within an ultraviolet light spectrum or an infrared light spectrum, or any other spectrum suitable for generating a detectable speckle pattern.

In a preferred embodiment the at least one laser operates in the infrared light spectrum.

Alternatively, the at least one laser can be configured to pulse light at specific frequencies and/or patterns (i.e. frequency markers). Modulating the laser coinciding with image capture can allow the subtraction of ambient light from the infrared image when taking sequentially an image with laser light and without laser light. Subtracting the two images will yield an image of the laser-light-illuminated object only.

According to the invention the at least one laser is a vertical cavity surface emitting laser (VCSEL), or a VCSEL array consisting of multiple VCSEL emitters. In a preferred embodiment the VCESL array consists of between 20 to 200 VCSEL emitters.

In a preferred embodiment of the invention, the at least one laser is a VCSEL. Although any type of laser may be used, VCSELs are relatively small in size, easing package considerations are relatively inexpensive to manufacture, easing cost considerations.

In a preferred embodiment the laser light as generated by the laser is in a wavelength range between 750 and 1000 nm. This range has the advantage that common Si-based sensors can be used.

In a more preferred embodiment of the invention, the at least one laser is an infrared VCSEL array.

In a further embodiment of the invention the VCSEL array is a monolithic chip as it provides good speckle contrast and thereby a high contrast in speckle pattern. However, other VCSEL chip architectures could also be used as long as they lead to a measurable speckle contrast.

In a preferred embodiment of the invention the light source of the invention is not operated with high frequency modulation. The high frequency modulation causes spectral broadening of the light and thereby reduces speckle formation. Alternatively, the high frequency modulation can be switched on or off whenever speckle formation is or is not desired, respectively.

According to the invention the biometric authentication device comprises an illumination path arranged to direct the illumination beam towards the portion of the individual so as to generate at least one corresponding image response. In one disclosure this illumination path is directly established by the light source unit. According to the invention the device further comprises an optical module through which the laser light as emitted by the laser is passed and modified to generate the illumination path.

According to the invention the illumination path comprises an optical element for broadening the illumination beam, which is preferably a diffusor. This has the advantage that the angle of the laser light beam is wider and thereby a larger field-of-view for the subsequent camera detection is generated.

In one embodiment the diffusor is a surface diffusor, wherein the diffusor material itself is transparent but the diffusor comprises a texture leads to diffraction of the light. The texture can be regular (such as a micro lens array) or it can be completely random (such as a sandblasted glass surface) or a combination thereof (e.g. a regular grid of micro lenses with varying size or shape of the micro lenses). As a result of the different textures, a broad range of diffraction patterns can be generated from a regular diffraction pattern (e.g. as generated by a perfectly regular micro lens array) to a completely irregular/random diffraction pattern (as generated by a sandblasted glass). In this invention, both are referred to as "illumination speckle".

In a further embodiment the diffusor is a volume diffusor, whereby scattering entities (which are preferably particles) in a transparent medium will redirect the incoming light.

In a third embodiment diffusor can be a combination of a surface and a volume diffusor, such as a transparent medium with embedded scattering particles and a rough diffracting texture.

According to the invention the diffusing element(s) of the diffusor which could be the diffusor medium and/or the diffusor texture has to be stationary insofar it generates a stationary diffraction pattern. The stationary diffraction pattern leads to a consistent speckle contrast so that even small differences in speckle contrast due to the illumination of biological vs. non-biological surfaces can be differentiated in a robust and reproducible manner.

Accordingly, it is preferred that the device comprises means to enable a less dynamic or even static arrangement of the major elements of the device, namely the light source, the diffusor, the camera and the target object. A continuous movement of the object or a movement of the diffusor in front of the light source would lead to a dynamic speckle that due to the necessary averaging algorithms would reduce or even prevent the discrimination of speckle contrast differences.

In a further embodiment of the invention, the biometric identification system can provide both arrangements, so that the user can choose between a dynamic speckle (and thus average over it) in case the speckle signal is not wanted, and a stationary system leading to the speckle contrast according to the invention.

According to the invention, the biometric identification system can differentiate between a biological tissue and a non-biological object due to a difference in speckle contrast for at least 1%.

According to the invention the biometric identification system of the system can be used to authenticate each portion of the individual that essentially consists of biological tissue. The biological tissue can be represented by the skin or other parts of the body such as the iris.

Accordingly, the portion of the individual that is analysed by the biometric identification system and method of the invention can be e.g. finger or finger tip, a hand palm, a retina or a face.

In a preferred embodiment the portion of the individual that is analysed is the head or the face of the individual.

In one embodiment of the invention the biometric identification further comprises a filter being located in the light path between the individual that is analysed and image sensing unit in order to block at least a portion of the ambient light so as to support the analysis of the speckle contrast.

In another embodiment, the light source is modulated coinciding with image capture, allowing the subtraction of ambient light from the infrared image when taking sequentially an image with laser light and without laser light. Subtracting the two images will yield an image of the laser-light-illuminated object only.

In another embodiment of the invention the biometric identification system further comprises a position structure to bring the portion to be analysed in a predetermined position with regard to the light source unit and/or the image sensing unit and filtering out visible light so as to support the analysis of the speckle contrast. Thereby the positioning system enables the capture of the image in a defined way which enhances the secure authentication of the individual.

It is preferred that within the biometric identification system of the invention the light source unit is arranged in a way to illuminate the portion of the individual from one angle only. This arrangement enhances the formation of a speckle pattern and thereby supports the discrimination between biological and non-biological tissue.

It is appropriate that the light source unit of the biometric identification system generates an illumination beam with a narrow spectral bandwidth and/or linear polarization state. A narrow bandwidth and also a linear polarization states enhance the formation of a speckle pattern, thereby leading to an optimal speckle contrast.

In one embodiment of the invention the image sensing unit of the biometric identification device of the invention is selected from the group consisting of CCD (chare-coupled-device) camera, IR camera, RGB camera, RGB+IR camera, photodetector, CMOS technology and other detector arrays.

When using an RGB camera it is preferred that the image sensor shows a Bayer arrangement of color filters on the pixel array. In the Bayer filter mosaic the filter pattern is 50% green, 25% red and 25% blue. However, alternative technologies such as color co-site sampling, the Foveon X3 sensor, a dichroic mirror or a transparent diffractive filter array can be also used.

In a preferred embodiment the camera is a RGB+IR camera with further detection of infrared light. Typically, the Bayer mosaic pattern as described above is hereby modified so that half of the green filters are converted to IR filters so that the resulting filter pattern is 25% green, 25% red, 25% blue and 25% infrared. However, the person skilled in art knows further strategies to construct a RGB+IR camera which he will choose according to the specific detection requirements.

It is preferred that the camera as used in the device and method has a small aperture, being preferably between 1 and 3 mm and more preferably between 1.5 and 2.5 mm. Bigger apertures lead to less pronounced speckle pattern.

In a preferred embodiment of the invention the light source and the camera are spaced on the device between 10 and 50 mm apart. This rather short distance enables the use for small-sized devices such as smart phones and laptops.

In a more preferred embodiment the distance between the light source and the camera is less than 40 mm, preferably less than 30 mm and more preferably less than 20 mm, and even more preferably less than 15 mm. Such a reduced distance has the advantage that the target, e.g. the face of a human being is evenly illuminated without creating any disturbing shadows.

The image sensing unit can communicate the computer readable image and/or data representing the speckle contrast to a computing device for analysis. As used herein, a computing device can comprise one or more processors, one or more computing platforms, a field programmable gate array, an amplification-specific integrated circuit, or any other electronic computation device. In various embodiments the computing device may be located locally with the biometric authentication system or may be located remotely, such as at least the speckle contrast is analyzed at a remote server. In any case, the computing device may identify, based on the speckle contrast, one or more characteristics that are associated with user identification.

In a preferred embodiment the image sensing unit does not analyze the image with regard to the speckle contrast but also with regard to individual characteristics in order to identify the individual. This may accomplished by identifying facial characteristics, fingerprint or vein images and comparison with respective pre-stored data.

In a second aspect the invention provides a mobile device comprising the biometric identification system of the invention.

In a preferred embodiment of the invention said mobile device is preferably a smartphone, a tablet PC, a notebook, a laptop, a webcam, a standalone webcam, a surveillance camera, a CCTV camera, a personal digital assistant or a digital camera.

In a more preferred embodiment the mobile device is a mobile phone or a laptop.

In a third aspect the invention provides an immovable or permanently installed device comprising the biometric identification system of the invention.

In a preferred embodiment of the invention said immovable of permanently installed mobile device is preferably a desktop PC, a webcam, a surveillance camera, or a CCTV camera.

In a fourth aspect the invention provides a method of differentiating biological tissue of from a non-biological object comprising the following steps:

illuminating a target region with a laser beam as generated by a at least one laser;

detection of the speckle contrast remitted from the target region;

determining based upon said speckle contrast the presence of the biological tissue or the non-biological object, respectively.

According to the invention the laser beam in the method of the invention is generated by at least one laser, so that one, two, three, four or even more lasers can be used for illuminating the target region. In a preferred embodiment the method uses only one laser for generating the laser beam.

Notably, the speckle contrast remitted from the target region can be the imaging speckle, the illumination speckle or a combination of both.

In a preferred embodiment for said method, the target region is illuminated with a diffracted laser beam, preferably by use of a surface or volume diffusor. As described above the method can also be used with a diffracted laser beam. The embodiments regarding the diffusor as described above for the biometric identification system of the invention also apply to the claimed method of differentiating biological tissue of from a non-biological object.

In a fourth aspect the invention provides a computing system for authenticating an individual through speckle contrast analysis.

Definitions

According to the invention "biometrics" is defined as measurements in the purpose to provide an identification or recognition function based upon a person's physical characteristics. Physical features include but are not limited to: facial features, retinal vessel pattern, finger prints. These features are signs of a living being and are generally not present in inanimate or spoofed tissue. Biometric measurements are used, for example, for security purposes such as building entrance restriction, document viewing restrictions, missile launch restrictions, personnel activity tracking, and even screening of possible terrorists at airports.

The term "spoofing" as used herein describes the act of creating a false (sham) or deceptive decoy that confuses a biometric authentication system into believing that the sham decoy is the real tissue, thus bypassing the security of the biometric identification system, and corrupting the inherent recognition and/or screening function that the biometric identification was intended to provide. The terms "sham tissue", non-biological object" and "counterfeit" are equivalent of spoofed tissues, and can be used in the context of spoofing.

According to the invention the term "speckle" encompasses "imaging speckle" and "illumination speckle". The imaging speckle is the classical speckle as observed as result of the illumination of a rough surface with coherent laser light. The illumination speckle denotes to the speckle-like pattern that is observed when a non-biological object is illuminated with a diffracted light beam. Without determination of the underlying mechanism it is hypothesized that the diffracted light with its diffraction pattern is reflected by the target leading to a non-uniform illumination of the camera sensor and thereby leading to a speckle-like pattern. The detected speckle contrast due to illumination speckle depends on the nature of the illuminated object.

Notably, both forms, the "imaging speckle" and the "illumination speckle" can occur simultaneously but according to the invention a discrimination is not required since an overall speckle contrast reduction is sufficient for biometric analysis. As an hypothesis it is believed that the illumination speckle is reduced by biological surfaces due to their action as volume scatterer. The light will travel in said tissues and exit the tissue in a different position to where it entered. If the illumination speckle has a small feature size on the skin, e.g. 1 mm peak to peak, the skin will "blur" the impinging light as it is behaves like a volume scatter. As a consequence the spatial extent of the light exiting the skin will be much more uniform than from the impinging light.

The term "diffusor" as used in the present invention denotes to a diffraction element that diffracts the light as generated by the light beam being preferably a laser. This encompasses surface diffusors, which represent transparent objects with a specific diffracting texture. This texture can be regular, random or a combination thereof. The term "diffusor" further encompasses so called volume diffusors, whereby, scattering entities (preferably particles) in a transparent medium will direct the incoming light. In addition the diffusor can be a combined surface and volume diffusor. According to the invention the diffusing element which could be the diffusor medium or the diffusor texture has to be stationary insofar it generates a stationary diffraction pattern.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principle sketch of the main components of an embodiment of biometric authentication system according to the present invention in a cross section.

FIG. 2 shows an image of a living person (left) and a dummy (right) generated according the biometric authentication method according to the present invention.

FIG. 3 shows a principle sketch of the two different embodiments of the biometric authentication system according to the present invention.

In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

Figure 1:
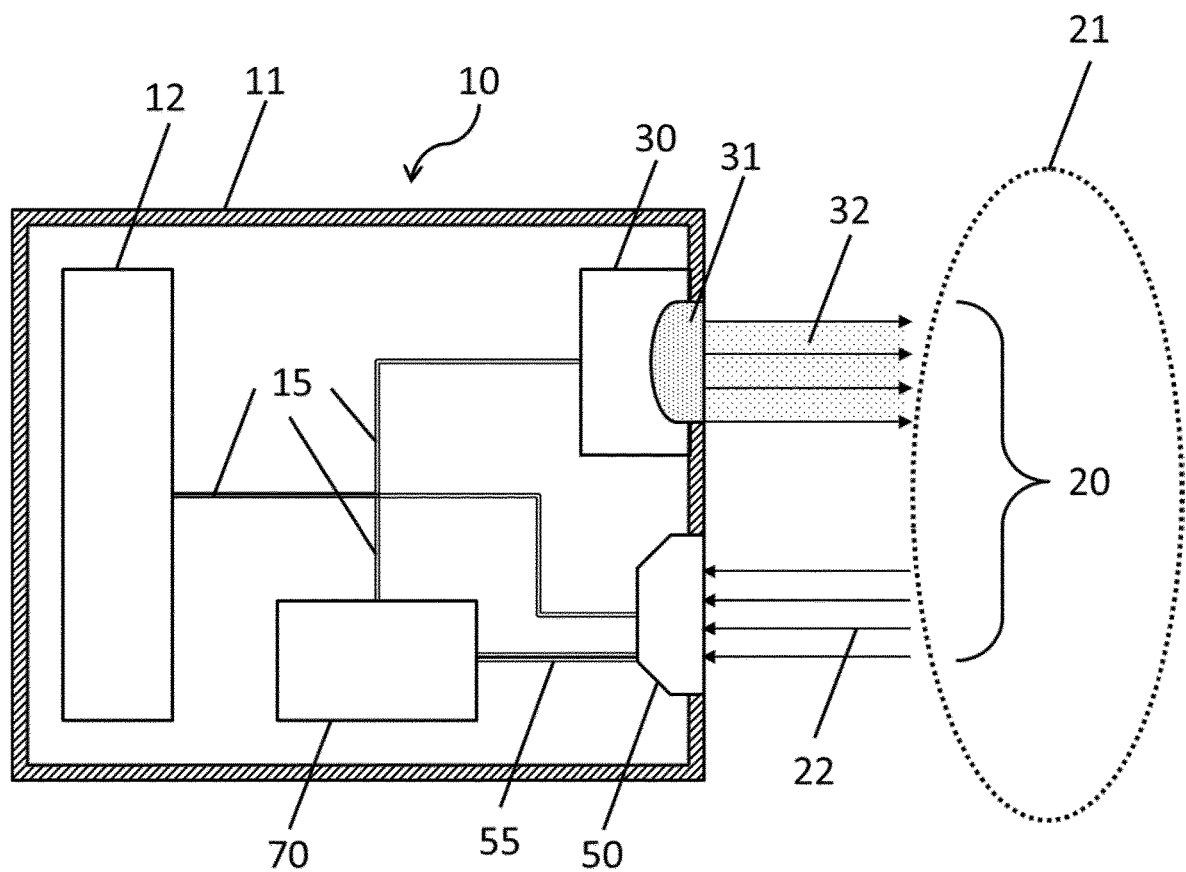

FIG. 1 shows a principle sketch of the main components of a biometric authentication system 10 not encompassed by the present invention in a cross section. Hereby a housing 11 encloses the major components of the system such as the power source unit 12 which is connected via electric connections 15 to the different loads. A laser 31 contained within a light source unit 30 generates a laser beam 32 projected towards the portion 20 of the individual 21 so as to generate at least one corresponding image response 22. The image response 22 is detected by an image sensing unit 50 capturing the speckle pattern in the image created by the image sensing unit and thereby form a computer readable image and/or data representing the speckle contrast (both are not shown here) which are transferred via a data line 55 to the computing device 70 for subsequent analysis of the computer readable image data and/or the speckle contrast data. This arrangement corresponds to typical biometric authentication system.

In other aspects not shown here the biometric authentication system 10 further comprises a an illumination path 40 arranged to direct the illumination beam towards the portion 20 of the individual 21 so as to generate at least one corresponding image response 22.

Figure 2:
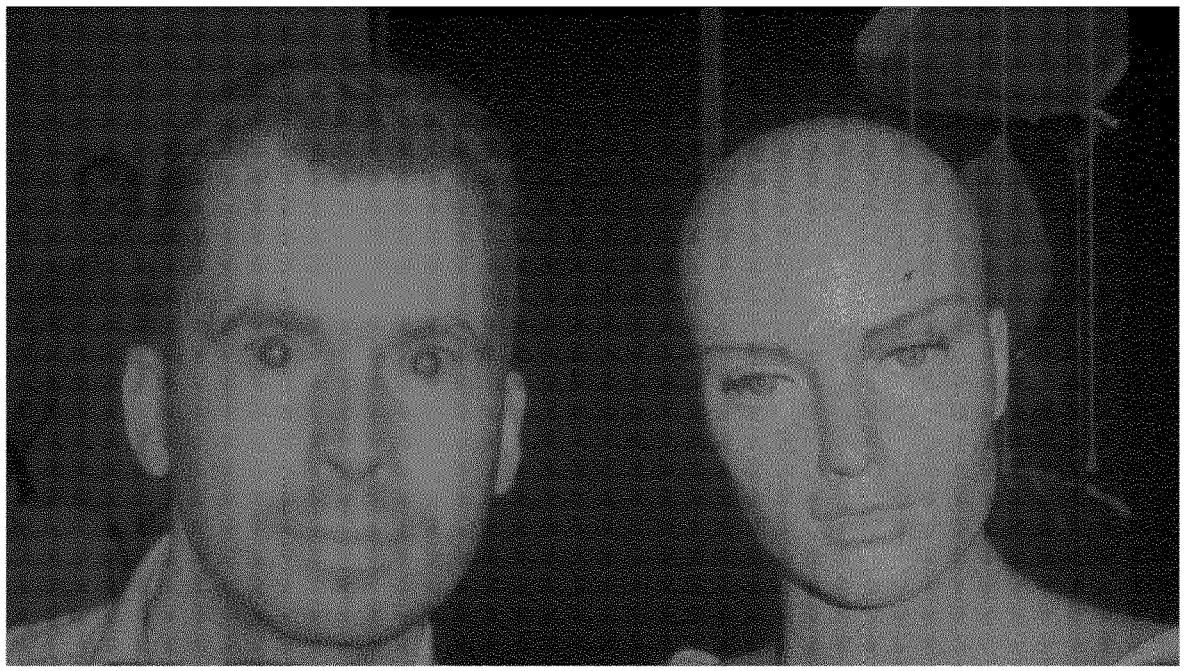

FIG. 2 shows an image of a living person (left) and a dummy (right) generated according the biometric authentication method according to the present invention. Even without sophisticated data analysis it can be clearly seen that the laser light generates a smooth picture of the real person on the left whereas the dummy on in the right shows the typical speckle pattern due to laser interference.

FIG. 3 shows a principle sketch of selected components of two embodiments of biometric authentication system 10 according to the present invention. According to FIG. 3A, the authentication system comprises a laser 31 as a light source to generate a coherent laser beam 32 for illumination of the target, namely the individual 21. The illumination path 40 is represented by the light path from the laser 31 to the individual 21. FIG. 3B shows a system, whereby the coherent laser beam as generated by the laser 31 is broadened by a diffusor 60 inserted in the illumination path to generate a broadened and diffracted laser beam 33, so that the light beam is broadened and possesses a diffraction pattern with peaks and valleys. The illumination path 40 is represented by the light path from the laser 31 via the diffractor 60 to the individual 21. The light of the light beam is reflected by the individual 21 to reach a camera (not shown here) for image analysis.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 biometric authentication device
11 housing
12 power source unit
15 electronic connections
20 portion (of the individual)
21 individual
22 image response
30 light source unit
31 laser
32 laser beam
33 diffracted laser beam
40 illumination path
50 image sensing unit
55 data line
60 diffusor
70 computing device

The invention claimed is:

1. A biometric identification system for authenticating a biometric on a portion of an object, the system comprising:
    at least one light source comprising at least one of a vertical surface emitting laser (VCSEL) or a VCSEL array configured to provide an illumination beam when the biometric authentication system is turned on;
    a diffusor configured to broaden the illumination beam and direct the broadened illumination beam directly to the portion of the object so as to generate at least one corresponding image response; and
    an image sensor configured to receive the at least one corresponding image response, capture a speckle pattern in the image response and provide data representing a speckle contrast in the speckle pattern.

2. The biometric identification system in accordance with claim 1, wherein the diffusor comprises at least a diffusor material and a diffusor pattern.

3. The biometric identification system in accordance with claim 1, wherein the illumination beam is a laser beam with a coherence length of at least 1 mm.

4. The biometric identification system in accordance with claim 1, wherein the at least one of the VCSEL and the VCSEL array is a VCSEL array comprising between 20 and 200 VCSEL emitters.

5. The biometric identification system in accordance with claim 1, wherein the portion of the object is one of a finger, a finger tip, a hand palm, an iris, a retina, or a face of a human.

6. The biometric identification system in accordance with claim 1, further comprising a filter located between the object and the image sensor and configured to filter out ambient light.

7. The biometric identification system in accordance with claim 1, further comprising a position structure configured to bring the portion in a predetermined position relative to at least one of the light source unit or the image sensor and filter out visible light.

8. The biometric identification system in accordance with claim 1, wherein the light source is configured to illuminate the portion of the object from only one angle.

9. The biometric identification system in accordance with claim 1, wherein the illumination beam has at least one of a narrow spectral bandwidth or linear polarization state.

10. The biometric identification system in accordance with claim 1, wherein the image sensor is selected from the group consisting of a charge-coupled device (CCD) camera, an IR camera, an RGB camera, an RGB+IR camera, a photodetector, and CMOS technology.

11. A mobile device comprising:
    at least one light source comprising at least one of a vertical surface emitting laser (VCSEL) or a VCSEL array configured to provide an illumination beam when the biometric authentication system is turned on;
    a diffusor configured to broaden the illumination beam and direct the broadened illumination beam directly to the portion of the object so as to generate at least one corresponding image response; and
    an image sensor configured to receive the at least one corresponding image response, capture a speckle pattern in the image response and provide data representing a speckle contrast in the speckle pattern.

12. The biometric identification system in accordance with claim 1, wherein the biometric identification system is one of an immovable or permanently installed device selected from the group consisting of a desktop PC, a webcam, a standalone webcam, a surveillance camera, a CCTV camera or a digital camera.

13. A method of differentiating biological tissue from a non-biological material of an object, the method comprising:
    directly illuminating a target region with a broadened laser beam generated by one of a VCSEL or a VCSEL array;
    detecting a speckle contrast remitted from the target region; and
    determining, based upon said speckle contrast, whether the target region comprises the biological tissue or the non-biological tissue, respectively.

14. The method in accordance with claim 13, further comprising diffracting a laser beam to create the diffracted laser beam using a surface or volume diffusor.

15. The biometric identification system in accordance with claim 1, further comprising a computing device configured to analyze the data representing the speckle contrast generated by the image sensing unit to verify the portion of the object as biological tissue.

16. The biometric identification system in accordance with claim 2, wherein the diffusor is at least one of a surface diffusor with the diffusor texture being one of a regular texture, a random texture or a combination of the regular texture and the random texture, or a volume diffusor.

17. The biometric identification system in accordance with claim 1, wherein the illumination beam is a laser beam with a coherence length of at least 1 cm.

18. The biometric identification system in accordance with claim 1, wherein the illumination beam is a laser beam with a coherence length of at least 10 cm.

19. The mobile device of claim 11, wherein the mobile device is one of a smartphone, a tablet PC, a notebook, a laptop, a webcam, a standalone webcam, a surveillance camera, a CCTV camera, a personal digital assistant or a digital camera.

20. The system of claim 1, wherein the target object is at a fixed position relative to at least one of the camera, the diffusor or the light source.

* * * * *